Figure 1:
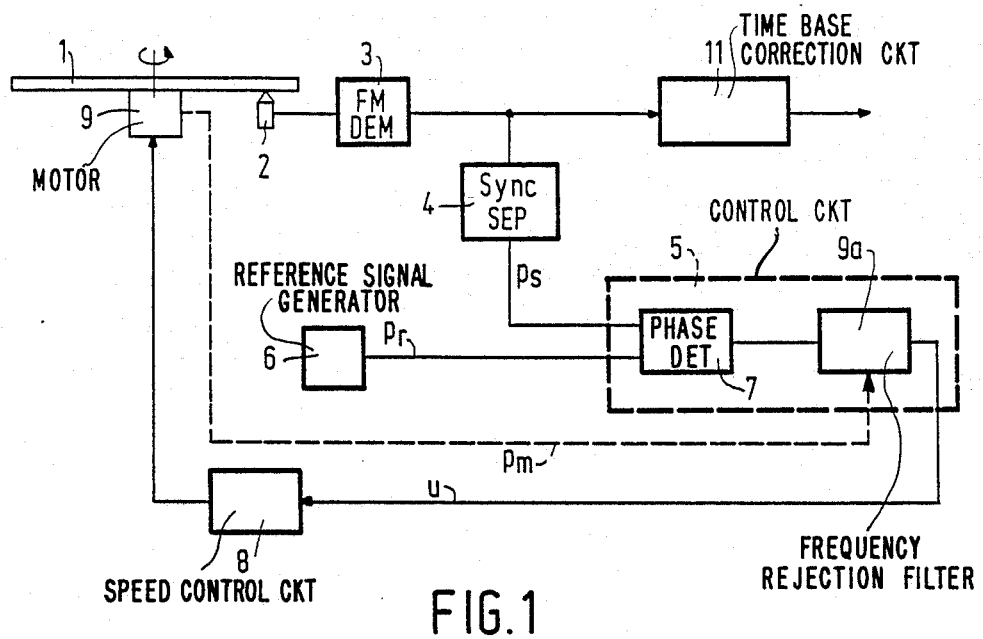

United States Patent [19]

Overath et al.

[11] Patent Number: 4,819,221

[45] Date of Patent: Apr. 4, 1989

[54] APPARATUS FOR READING RECORD CARRIERS HAVING SUBSTANTIALLY CONCENTRIC OR SPIRAL TRACKS

[75] Inventors: Hilde M. A. Overath; Cornelius A. Hezemans; Johannes L. Bakx, all of Eindhoven, Netherlands

[73] Assignee: U.S. Philips Corporation, New York, N.Y.

[21] Appl. No.: 94,575

[22] Filed: Sep. 9, 1987

[51] Int. Cl.$^4$ .......................... G11B 19/24; H04N 5/76
[52] U.S. Cl. ...................................... 369/50; 358/338; 358/342
[58] Field of Search .................. 358/322, 338, 342; 360/73; 369/50, 47

[56] References Cited

U.S. PATENT DOCUMENTS

| | | | |
|---|---|---|---|
| 4,123,779 | 10/1978 | Goldschmidt | 360/73 |
| 4,313,191 | 1/1982 | Winslow et al. | 369/50 |
| 4,439,849 | 3/1984 | Nabeshima | 358/338 |
| 4,481,615 | 11/1984 | Hioki | 358/338 |
| 4,623,939 | 11/1986 | Machida et al. | 369/50 |
| 4,672,595 | 6/1987 | Senso | 358/338 |
| 4,710,825 | 12/1987 | Okita et al. | 358/338 |

Primary Examiner—Donald McElheny, Jr.
Attorney, Agent, or Firm—Algy Tamoshunas

[57] ABSTRACT

A read apparatus for reading a record carrier (1) having a concentric track pattern comprises a scanning device (2, 3) for reading the information, and a separator circuit (4) for extracting a periodic synchronizing signal (Ps) from the information read. By means of a servo system, which inter alia includes a drive motor (9) for driving the disc 1 and a control circuit (5), the rotational speed of the disc is controlled so as to maintain the periodic synchronizing signal (Ps) in synchronism with a reference signal (Pr). The circuit (9a) rejects those signal components in the control signal (U) for the motor (9) which are caused by an eccentric position of the center of rotation of the disc relative to the track pattern. This prevents these signal components from causing an unnecessary dissipation of electric power in the motor, yielding a substantial improvement in motor efficiency.

6 Claims, 4 Drawing Sheets

APPARATUS FOR READING RECORD CARRIERS HAVING SUBSTANTIALLY CONCENTRIC OR SPIRAL TRACKS

The invention relates to an apparatus for reading a rotating record carrier having substantially spiral or concentric tracks in which information is stored, which information comprises at least one periodic synchronising signal, the apparatus comprising a scanning device for reading the information, a separator circuit for extracting the synchronising signal from the information read, and a servo system for controlling the rotational speed of the record carrier to a value for which the synchronising signal is in synchronism with a reference signal, for which purpose the servo system comprises a motor for driving the record carrier and a controller for deriving a control signal for the motor from the synchronising signal and the reference signal.

Such a read apparatus for reading video discs is known from German Offenlegungsschrift DE-OS No. 25 21 821. The known read apparatus extracts a periodic synchronising signal comprising the video line-synchronising pulses of the video signal read from the video disc. By means of a phase detector the phase difference of the line-synchronising pulses is compared with a pulse-shaped reference signal whose frequency corresponds to the line frequency customary in video reproduction. The phase difference is employed as an error signal for controlling the speed of the motor to a value at which the line-synchronising pulses are in synchronism with the pulse-shaped reference signal. This provides a correction for low-frequency time errors in the video signal. The high-frequency time errors in the video signal are corrected by moving the scanning device in the tangential direction depending on the high-frequency component in the phase error. Although the above control system perform satisfactorily, it is found in practice that the electric power dissipated in the motor is high, which means a low efficiency of the motor.

It is the object of the invention to provide an apparatus of the type defined in the opening paragraph with improved motor efficiency.

According to the invention this object is achieved in that the servo system comprises means for selectively rejecting those signal components in the control signal which have a frequency corresponding to the rotational frequency of the record carrier.

The invention is based on the recognition of the fact that the high dissipation of the motor is mainly caused by periodic variations of the frequency of the synchronising signal, which arise because the centres of rotation of the record carriers are off-centred relative to the concentric or spiral track patterns. The frequency of these frequency variations generally lies outside the bandwidth of the servo system, so that this frequency variation is not or hardly corrected by the servo system. However, this frequency variation does give rise to an undesired variation of the control signal of the motor, leading to additional dissipation of electric power in the motor.

The frequency of the frequency variations of the synchronising signal caused by eccentricity errors is equal to the rotational frequency of the record carrier, so that the selective rejection of this frequency component in the control signal provides a substantial improvement in motor efficiency without the control characteristics of the servo system being adversely affected.

An embodiment of the read apparatus is characterized in that the rejection means comprise a selective rejection filter which is tuned to the rotational frequency of the record carrier.

In video discs of the CLV type, which must be scanned with a constant linear scanning velocity the speed of rotation of the record carrier depends on the radial position of the track being scanned. During scanning of the video disc of the CLV type it is therefore necessary that the tunig of the rejection filter is constantly adapted to the instantaneous speed of rotation of the disc.

A further embodiment of the read apparatus is characterized in that the selective rejection filter is a clocked sequential filter, the read apparatus further comprising a pulse generator for generating the clock signal for the sequential filter with a frequency proportional to the speed of the motor.

Another embodiment of the read apparatus is characterized in that the rejection means comprise a compensation circuit for removing said component from the control signal by applying a compensation signal to the servo system, for which purpose the compensation circuit comprises a function generator for generating the compensation signal in synchronism with the rotational speed of the motor and an adaptation circuit for adapting the amplitude and phase of the compensation signal. By adjusting the phase and amplitude of the compensation signal this embodiment enables a substantially complete elimination of the frequency component caused in the motor control signal by an eccentricity of the centre of rotation.

A further embodiment of the read apparatus is characterized in that the read apparatus comprises a detection circuit for detecting the phase and amplitude of the rotational frequency component in the control signal during an initialising interval in which the compensation circuit is inoperative and an adaptation circuit for adapting the phase and amplitude of the function generator in conformity with the phase and amplitude thus detected. This embodiment has the advantage that the phase and amplitude are always adapted automatically to the disc being read.

Figure 2:
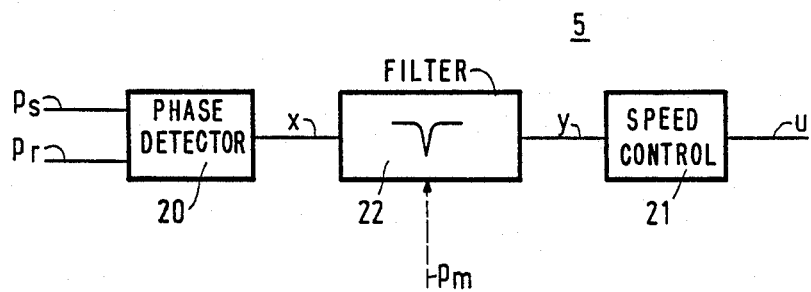
Figure 3:
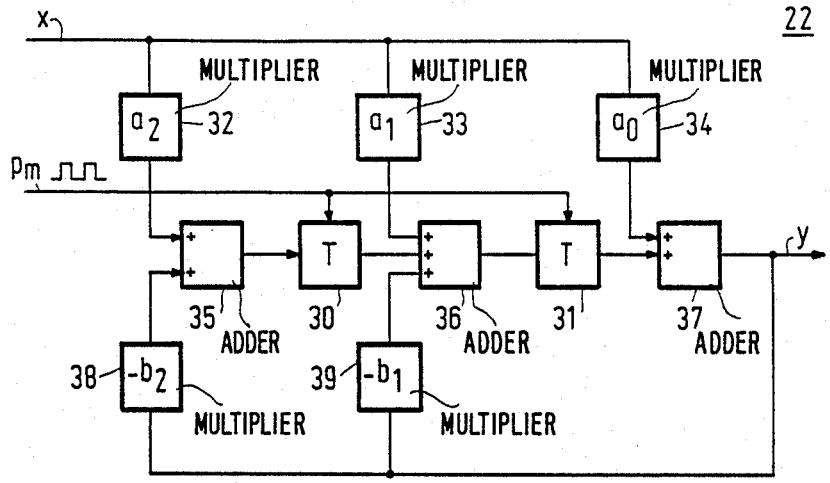
Figures 4A, 4B:
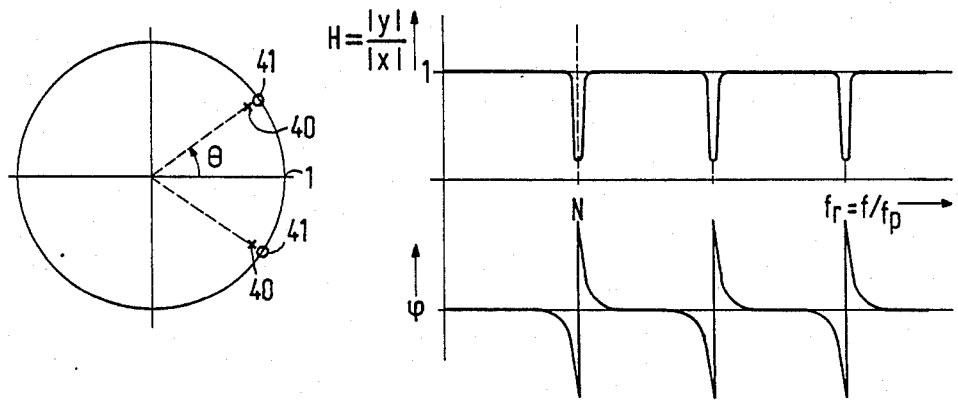
Figure 5:
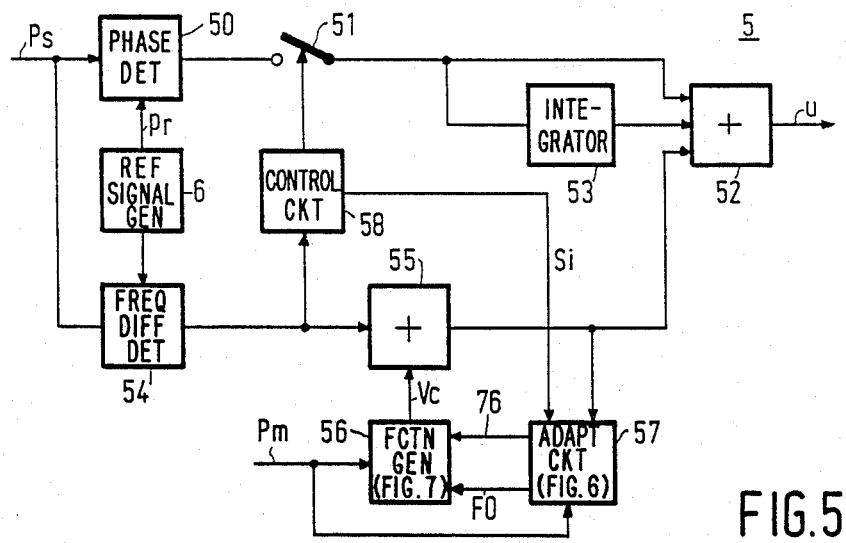
Figure 6:
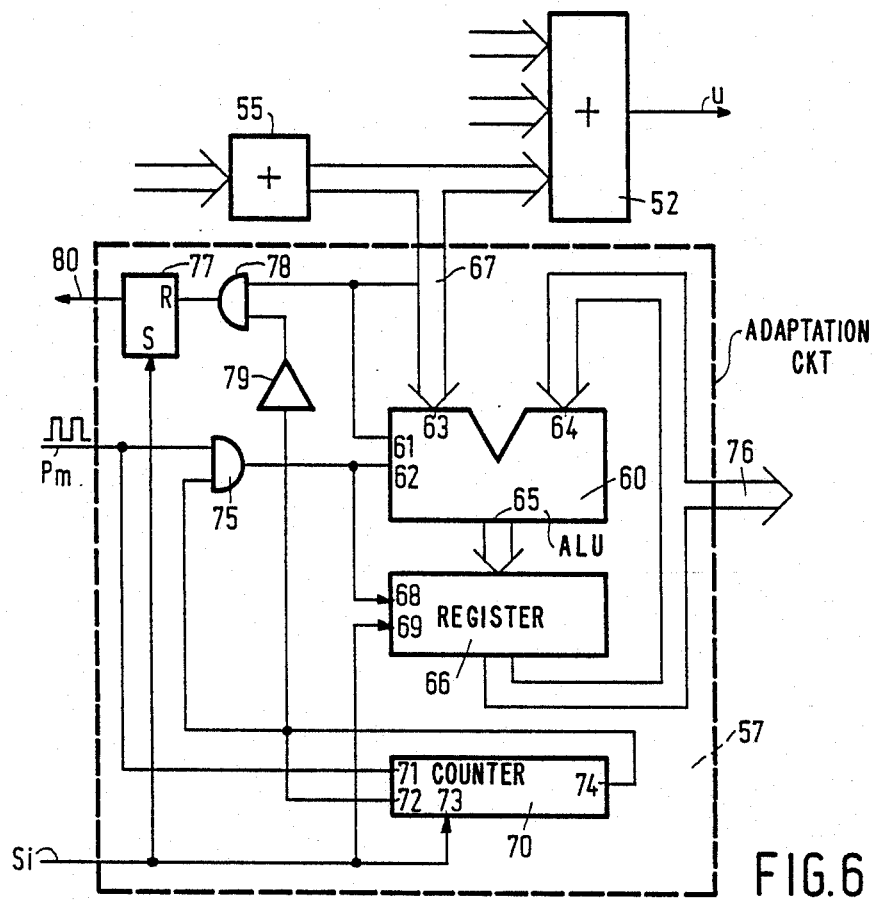
Figure 7:
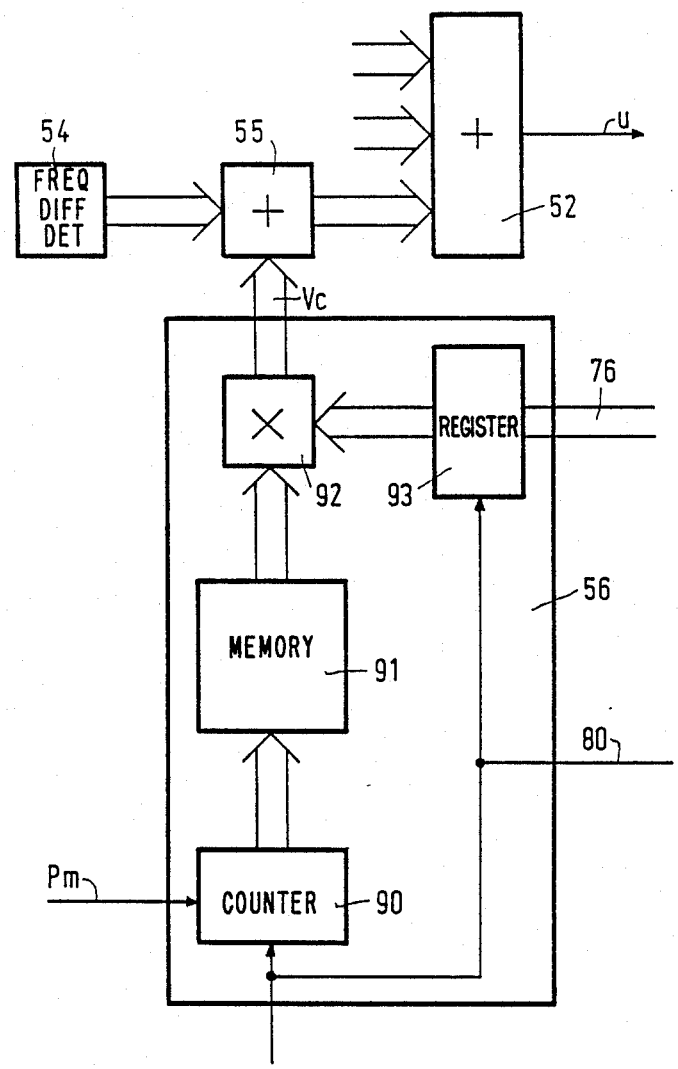

Embodiments of the invention and further advantages thereof will now be described in more detail, by way of example, with reference to FIGS. 1 to 7, of which FIG. 1 shows an embodiment of the read apparatus in accordance with the invention, FIG. 2 shows an example of a control circuit for use in the read apparatus, FIG. 3 shows a sequential selective rejection filter for use in the control circuit, FIGS. 4a and 4b show the pole-zero configuration the transmission characteristic and the phase characteristic of the sequential selective rejection filter, FIG. 5 shows another example of the control circuit, FIG. 6 shows an example of a detection circuit for use in the control circuit, and FIG. 7 shows an example of a function generator for use in the control circuit.

FIG. 1 shows an embodiment of the read apparatus in accordance with the invention. The reference numeral 1 denotes a record carrier containing information comprising aperiodic synchronising signal. Such a record carrier 1 may be, for example, a video disc on which a frequency-modulated video signal is recorded, comprising a periodic synchronising signal in the form of the line synchronising pulse. However, the periodic synchronising signal may also be recorded in a different manner, for example by means of a radial track modulation, as is described in the Applicant's U.S. Pat. Ser. No. 4,375,088. By means of a scanning device 2 the frequency-modulated video information is read from the video disc 1 and is subsequently demodulated by an FM-demodulator circuit 3. A separator circuit 4 extracts the line synchronising pulses Ps from the demodulated video signal. In a control circuit 5 the line synchronising pulses Ps are compared with a pulse-shaped reference signal Pr which is generated by a reference source 6, the frequency of this signal corresponding to the customary line frequency in video reproduction. The control circuit 5 derives a control signal U from the synchronising pulses Ps and the reference signal Pr and via an energising circuit 8, applies it to a motor 9 for driving the video disc 1. The feedback servo system thus formed controls the speed of the motor 8 to maintain the line synchronising pulses Ps substantially in synchronism with the pulse-shaped reference signal Pr. Generally, the centre of rotation of the disc 1 is not exactly centred relative to the track pattern on the disc but is slightly off-centred relative to this track pattern. As a result of this, the frequency of the line synchronising pulses Ps will vary with a frequency equal to the rotational frequency of the disc 1. Generally, this frequency is situated outside the bandwidth of the servo system, so that the servo system does not provide a correction for this frequency variation. By means of a rejection circuit 9a the component in the control signal which has a frequency equal to the rotational frequency of the disc is rejected selectively. This ensures that this frequency component, which does not significantly contribute to a reduction of the frequency variation of the line synchronising pulses, cannot give rise to an unnecessary power dissipation in the motor. Since rejection is effected selectively the original control characteristics of the servo system is hardly or not influenced. In video discs of the CAV type, where the angular velocity of the disc is substantially constant during reading, the frequency of the component to be rejected remains constant, so that the rejection device can always stay tuned to the same rejection frequency. However, in video discs of the CLV type, in which the linear scanning velocity remains constant, the rotational frequency changes during reading. In that case the rejection circuit 9a must be adapted continually to the rotational frequency of the disc. This may be effected, for example, by adapting the rejection frequency in response to a speed signal Pm which is representative of the speed of the motor 1. The speed signal Pm can be generated, for example, by means of a customary encoder disc which is mounted on the motor shaft and which generates a speed signal Pm in the form of pulses with a frequency proportional to the speed of the motor 1. If the motor 9 is a brushless d.c. motor with an electronic commutation circuit the speed signal Pm can be derived very simply by means of this cummutation circuit. This is because such a commutation circuit generates control signals whose frequency is proportional to the speed of the motor, from which the speed signal Pm can be derived directly.

In the manner described in the foregoing time errors in the video signal of a frequency within the bandwidth of the servo system are largely corrected. The video signal thus corrected, which appears on the output of the FM demodulator circuit, is subsequently applied to an electronic time base correction circuit 11 to correct residual high-frequency time errors, which include inter alia the time errors caused by an eccentricity of the centre of rotation of the disc 1.

FIG. 2 shows an example of the control circuit 5, in which the phase difference between the line synchronising pulses Ps and the pulse-shaped reference signal Pr is detected by means of a phase detector 20. The output signal of the phase detector 20, which signal is representative of a specific phase difference, is applied to a controller 21, for example a PID controller, via a selective rejection filter 22 which is tuned to the rotational frequency of the disc 1. The controller 21 processes the filtered output signal of the phase detector 20 to form a suitable control signal U for the motor 9. Since the component of the rotational frequency is rejected strongly by means of the filter 22 the control signal U for the motor will hardly contain any components of this frequency. It will be evident to those skilled in the art that, in principle, the sequence of the filter 22 and the controller 21 may be reversed. However, in order to prevent outranging of the controller 21 by the component of the rotational frequency, it is preferred to arrange the filter 22 before the controller 21.

FIG. 3 shows an example of a selective rejection filter 22 in the form of a sequential filter controlled by the pulse-shaped speed signal Pm. The filter 22 comprises two clocked delay elements 30 and 31, for example digital delay elements in the form of clocked parallel-in parallel-out registers to which the pulse-shaped speed signal Pm is applied as the clock signal. The input signal x of the filter is multiplied by a2, a1 and a0 by the circuits 32, 33 and 34 respectively and is subsequently applied to the respective adder circuits 35, 36 and 37. The output signals of the adder circuits 35 and 36 are applied to the respective inputs of the delay elements 30 and 31. The output signal y of the sequential filter is supplied by the adder circuit 37. The output signal is additionally multiplied by −b2 and −b1 by the circuits 38 and 39 respectively and is subsequently applied to the adder circuits 35 and 36 respectively. Thus, a second-order sequential filter is obtained having two poles and two zero points whose positions are determined by the coefficients a2, a1, a0 and −b2 and −b1.

The pole-zero configuration in the Z-domain for a suitable sequential filter 22 is shown in FIG. 4a, where the poles bear the reference numeral 40 and the zero points bear the reference numeral 41. A filter having such a pole-zero configuration has a transmission characteristic as shown in FIG. 4b, which shows the transmission ratio H between the absolute values of the signals x and y and the phase difference $\phi$ between x and y as a function of the relative frequency $f_r = f/fp$, f being the frequency of the signals x and y, and fp being the frequency of the speed signal Pm. The transmission ratio H is always equal to unity, except for specific values of fr for which the transfer function assumes a minimal value. (The value of fr for which the transfer function is minimal will be referred to briefly as the tuning ratio N). The relative tuning ratio N is defined by the magnitude of the angle $\theta$ shown in FIG. 4a. This angle $\theta$ is selected in such a way that the tuning ratio N is equal to the number of pulses Pm supplied per revolution of the motor, so that regardless of the motor speed the filter always rejects the component in the input signal x having a frequency equal to the rotational frequency. This results in a selective rejection filter having a tuning frequency which always corresponds to the rotational frequency of the disc 1. As is indicated in FIG. 4b, the phase shift $\phi$ introduced by the rejection filter 22 for frequencies outside the rejection band is substantially zero, which means that the stability of the servo system is hardly affected by the use of the rejection filter, provided that the tuning frequency of the filter is situated outside the bandwidth of the servo system. Satisfactory results have been obtained with a constant bandwidth of the servo system of 7 Hz and a tuning frequency which varies between 10 and 30 Hz for CLV discs. Such a constant bandwidth can be obtained, for example, by arranging an amplifier in the speed feedback loop, the gain factor of this amplifier being adapted depending on the rotational frequency of the disc 1.

FIG. 5 shows another example of the control circuit 5. In this circuit the line synchronising pulses Ps are applied to a phase detector 50 to detect the phase difference between the line synchronising pulses Ps and the pulse-shaped reference signal Pr. The output signal of the phase detector 50 is applied to an adder circuit 52 and an integrator 53 via a switch 51 which is controlled by a control circuit 58. The integrated phase difference on the output of the integrator 53 is also applied to the adder circuit 52. Moreover, the line synchronising pulses Ps are applied to a frequency-difference detector 54 to detect the difference between the frequency of the line synchronising pulses Ps and the frequency of the reference signal Pr. The output signal of the detector 54, which is a measure of the frequency difference thus detected, is applied to the adder circuit 52 via a correction circuit 55. The output signal of the adder circuit 52 functions as the control signal U. As a result of the periodic variation of the frequency of the line synchronising pulses Ps caused by the eccentricity of the centre of rotation of the disc 1, the output signal of the frequency-difference detector 54 exhibits in a undesired component of a frequency equal to the rotational frequency of the disc 1. (Hereinafter the undesired components of this frequency will be referred to briefly as periodic spurious signals). The eccentricity of the centre of rotation of the disc 1 also causes periodic spurious signals in the output signals of the phase detector 50 and the integrator 53, but these appear to be negligible in comparison with the component in the output signal of the frequency-difference detector 54. A function generator 56, which is controlled by the pulse-shaped speed signal Pm, generates a compensation signal Vc which in synchronism with the speed of the motor 9 and hence with the rotational speed of the disc 1. The amplitude and phase of the compensation signal Vc are adapted in such a way that the compensation signal Vc is opposite to the periodic spurious signal in the output of the detector 54. By means of the adder circuit 55 the compensation signal Vc is added to the output signal of the detector 54, with the result that the spurious signal in the output signal of the adder circuit and hence in the control signal u, is largely eliminated. The phase and amplitude are adapted by means of a detection circuit 57. The phase and amplitude of the compensation signal Vc are adapted during an initialising interval after switching on of the read apparatus. After a new disc 1 has been placed in the read apparatus the servo system for controlling the speed of the motor 9 is switched on again with the switch 51 in the open position. The speed of the motor 9 is then controlled only in response to the frequency difference between the line synchronising pulses Ps and the reference signal Pr, as detected by the detector 54. The signal on the output of the detector 54, which signal is representative of the frequency difference, is also applied to the control circuit 58. When this frequency difference indicates that the desired speed of the motor 9 is reached the control circuit 58 generates a control signal for closing the electronic switch 51. Moreover, in response to the desired speed being reached the detection circuit 57 is rendered operative; the detection circuit 57 then disables the function generator 56. Subsequently the adaptation circuit determines the amplitude and phase of the periodic spurious signal in the output of the adder circuit 55 caused by the eccentricity, which spurious signal is identical to the spurious signal in the output signal of the detector 54, because the function generator 56 is inoperative. After the phase and amplitude have been determined the function generator 56 is set in conformity with this phase and amplitude, in such a way that the output signal is opposite to the spurious signal in the output signal of the detector 54 caused by the eccentricity, thus eliminating the spurious signal on the output of the adder circuit 55.

FIG. 6 shows an example of the detection circuit 57 in detail in the case that the output signal of the adder circuit 55 is a digital signal. The adaptation circuit 57 comprises an arithmetic logic circuit 60 (ALU) of a customary type for determining the sum of the absolute values of the output signal of the adder circuit 55 for a number (N) of pulses of the speed signal Pm corresponding to one revolution of the disc 1. (This sum is directly proportional to the amplitude to be detected of the periodic spurious signal in the output of the adder circuit 55 caused by the eccentricity). The circuit 60 has a first input 61 for selecting the arithmetic operation to be performed. When a signal of a first logic value is applied to the input 61 an adding operation is selected. When a signal of a second logic value is applied to the input 61 a subtraction is selected. In response to a clock pulse on a clock input 62 the circuit 60 performs the selected arithmetic operation on the signal values applied to the inputs 63 and 64. The result of the arithmetic operation is applied to a parallel-in parallel-out register 66 via an output 65, which register has a load-enable input 68 for loading the register 66 and a reset input 69 for resetting the register 66 to zero. The output of the register 66 is connected to the input 64 of the circuit 60. The input 63 of the circuit 60 is connected to the output of the adder circuit 55 via a bus 67. The signal line of the bus 67 which indicates the sign of the signal value of the signal on the bus 67 is connected to the select input 61. Further, the adaptation circuit 57 comprises a counter 60 having a clock input 71, an input 72 for inhibiting the counter 70, an input 73 for setting the counter to a predetermined initial count, and an output 74 indicating that a predetermined final count is reached. The output 74 is connected to the input 72 and an input of a two-input AND gate 75 whose output is connected to the clock input 62 and the load-enable input 68 of the arithmetic circuit 60 and the register 66 respectively. The pulse-shaped speed signal Pm is applied to the other input of the AND gate 75. A signal Si generated by the control circuit 58 is applied to the input 73 of the counter 70 to initiate the phase and amplitude detection. In response to a pulse-shaped signal Si the counter 70 is set to the initial count, so that the output signal on the output 74, which is a logic "1", indicates that the count of the counter is not equal to the final count. Subsequently, the counter 70 counts the successive pulses of the speed signal Pm unitl, when the final count is reached, the signal applied from the output 74 to the input 72, renders the counter inoperative. The initial and final counts of the counter 70 are selected in such a way that the number of pulses Pm counted before the final count is reached corresponds to one revolution of the disc 1. During the time interval in which the signal on the output 74 is "1" the pulses of the speed signal Pm are transferred to the clock input 62 of the arithmetic circuit 60 and the load-enable input 68 of the register 66 by the AND gate 75. The result of this, is that at a number of consecutive instants corresponding to one revolution of the disc 1 the signal value on the input 63 is added to or substracted from the signal value on the output of the register 66, depending on the sign of the signal value of the signal on the output 63 as indicated by the signal on the input 61. This results in the sum of the absolute signal values of the output signal of the adder circuit 55 being obtained during a time interval corresponding to one revolution of the disc 1. During this time interval the function generator 56 is inoperative, so that the sum value thus obtained on the output of the register 66 is directly proportional to the amplitude of the eccentricity-induced periodic spurious signal on the output of the register 66. This sum value is applied to the function generator 56 via a bus 76 to adapt the amplitude of the compensation signal Vc to this sum value. For the purpose of phase detection the detection circuit 57 comprises a flip-flop 77 and a two-input AND-gate 78. One of the inputs of the AND gate 78 is connected to the signal line of the bus 67 which indicates the sign of the signal value of the signal on the bus 67, whilst the output signal on the output 74 of the counter 70 is applied to the other input via an inverter circuit 79. The output of the AND gate 78 is connected to a positive edge-controlled reset input of the flip-flop 77. The control signal Si from the control circuit 58 is applied to a set input of the flip-flop 77. In response to the signal Si the flip-flop 77 is set to a logic "1" state. When the counter 70 has reached its final count the output of the inverter circuit 79 goes "1". Upon the next 0-1 transition on the signal line of the bus 67 indicating the sign of the signal value the output signal on the output of the AND gate 78 also changes from "0" to "1", causing the flip-flop 77 to be reset to the "0" state. The 1-0 transition on the output of the flip-flop 77 thus indicates the instant at which the spurious signal caused by the eccentricity intersects the zero level in a positive-going sense, at which instant the phase of the spurious signal is 0. This output signal of the flip-flop 77 is applied to the function generator 56 via a signal line 80 for phase adaptation.

FIG. 7 shows an embodiment of the function generator 56. The function generator 56 comprises a cyclic counter 90 for counting the pulses of the pulse-shaped speed signal Pm. The counting range of the counter 90 corresponds to the number (N) of pulses of the speed signal Pm generated in one revolution of the disc 1. The count of the counter 90 functions as the address for a memory 91 in which the successive function values of a sinewave signal are stored in the form of a table in storage locations with successive addresses. The function stored in the addressed storage location is transferred to a multiplier circuit 92 via an output of the memory, in which circuit these function values are multiplied by a signal value stored in a register 93. The output signal of the multiplier circuit 92 is applied to an adder circuit 55 as the compensation signal Vc. The data inputs of the register 93 are connected to the bus 76. A load-enable input of the register 93 for loading the register 93 with the data on its data inputs and a reset input for setting the counter 90 to zero are connected to the signal line 80. During phase and amplitude detection by the detection circuit 57 the logic level of the signal on the signal line 80 is "1", so that the count of the counter 90 is then maintained at zero. The relationship between the function values stored in the memory 91 and the count of the counter 90 is selected in such a way that the count "zero" corresponds to the function value K sin $\pi$, which ensures that the compensation signal remains zero during phase and amplitude detection. When the signal on the signal line 80 indicates a change of sign of the signal value on the output of the adder circuit 55, the counter is started and via the bus 76 the register 93, which is of the latch type, is loaded with the amplitude information instantaneously appearing on the output of the register 66 of the detection circuit 57. The phase of the eccentricity-induced spurious signal is zero at the instant of this change of sign, so that now the phase and amplitude of the compensation signal are such that the eccentricity-induced spurious signal is fully compensated for.

The detection circuit shown in FIG. 6 determines the desired phase and amplitude of the function generator in an initialising interval briefly after the read apparatus has been switched on. Since the amplitude and phase of the eccentricity-induced time errors do not change during reading of specific disc, the function generator has to be adjusted only once for each disc. However, it will be evident that during reading of the disc the phase and amplitude may be detected at regular intervals to adjust the function generator in conformity with this periodically detected phase and amplitude. By detecting the amplitude of the signal component of the rotational frequency in the output of the adder circuit 55 it is also possible to ascertain during reading whether the phase and amplitude of the compensation signal are still correct. When an incorrect setting of the function generator is thus detected, the function generator may be re-adjusted.

Further it will be obvious that the use of the detection circuit is not strictly necessary. For example, in a read apparatus with one disc which always remains in the read apparatus it is very well possible to carry out a one-time manual adjustment of the function generator to obtain the correct phase and amplitude.

The system described with reference to FIGS. 5 to 7 rejects frequency components in the control signal U for the motor 9 caused by an eccentric position of the centre of rotation of the discin the case that these frequency components are situated outside the band-width of the speed servo system. In optical playing apparatuses suitable for playing discs of different size the frequency components caused by the eccentricity errors for small discs may be situated within the bandwidth of the control circuit and those for larger discs may be situated outside the bandwidth of the control circuit as a result of different moments of inertia of the discs. In that case it may be useful to modify the circuit shown in FIG. 5 as follows. The size (or inertia) of the disc to be played can be determined by means of a detection system prior to playing. If a disc having a large moment of inertia is detected the frequency components caused in the control signal by eccentricity errors are eliminated as described hereinbefore. If a disc having a small amount of inertia is detected the phase and amplitude of the compensation signal Vc generated by the function generator 56 can be adapted so as to minimise the eccentricity-induced frequency components in the output signal of the detector 54.

What is claimed is:

1. An apparatus for reading a rotating record carrier having substantially spiral or concentric tracks in which information is stored, which information comprises at least one periodic synchronising signal, the apparatus comprising a scanning device for reading the information, a separator circuit for extracting the synchronising signal from the information read, and a servo system for controlling the rotational speed of the record carrier to a value for which the synchronising signal is in synchronism with a reference signal, for which purpose the servo system comprises a motor for driving the record carrier and a controller for deriving a control signal for the motor from the synchronising signal and the reference signal, characterized in that the servo system comprises means for selectively rejecting those signal components in the control signal which have a frequency corresponding to the rotational speed of the record carrier.

2. A read apparatus as claimed in claim 1, characterized in that the rejection means comprise a selective rejection filter which is tuned to the rotational frequency of the record carrier.

3. A read apparatus as claimed in claim 2, characterized in that the selective rejection filter is a clocked sequential filter, the read apparatus further comprising a pulse generator for generating the clock signal for the sequential filter with a frequency proportional to the speed of the motor.

4. A read apparatus as claimed in claim 1, characterized in that the rejection means comprise a compensation circuit for removing said components from the control signal by applying a compensation signal to the servo system, for which purpose the compensation circuit comprises a function generator for generating the compensation signal in synchronism with the rotational speed of the motor and an adaptation circuit for adapting the amplitude and phase of the compensation signal.

5. A read apparatus as claimed in claim 4, characterized in that the function generator comprises a counter, a circuit for deriving from the count the instantaneous signal value of the compensation signal, and a pulse generator for generating clock pulses for the counter in synchronism with the rotational speed of the motor.

6. A read apparatus as claimed in claim 4, or 5, characterized in that the read apparatus comprises a detection circuit for detecting the phase and amplitude of the rotational frequency component in the control signal during an initialising interval in which the compensation circuit is inoperative and an adaptation circuit for adapting the phase and amplitude of the function generator in conformity with the phase and amplitude thus detected.

* * * * *